United States Patent
Nanal et al.

(10) Patent No.: US 11,100,104 B2
(45) Date of Patent: Aug. 24, 2021

(54) QUERY TUNING UTILIZING OPTIMIZER HINTS

(71) Applicant: Accenture Global Solutions Limited, Dublin (IE)

(72) Inventors: Mihir S Nanal, Pune (IN); Vinitha Sunodh, Pune (IN); Deepak Jain, Pune (IN); Kiran Chaudhari, Pune (IN); Junaid M Khan, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 152 days.

(21) Appl. No.: 16/379,350

(22) Filed: Apr. 9, 2019

(65) Prior Publication Data
US 2020/0327127 A1 Oct. 15, 2020

(51) Int. Cl.
*G06F 16/30* (2019.01)
*G06F 16/2453* (2019.01)

(52) U.S. Cl.
CPC ................ *G06F 16/24542* (2019.01)

(58) Field of Classification Search
CPC ........... G06F 16/2453; G06F 16/24542; G06F 16/2435
See application file for complete search history.

(56) References Cited

U.S. PATENT DOCUMENTS

| | | | |
|---|---|---|---|
| 2004/0158551 A1* | 8/2004 | Santosuosso | G06F 16/24542 |
| 2005/0177557 A1* | 8/2005 | Ziauddin | G06F 16/217 |
| 2007/0038618 A1* | 2/2007 | Kosciusko | G06F 16/24534 |
| 2009/0077016 A1 | 3/2009 | Belknap et al. | |
| 2010/0250518 A1* | 9/2010 | Bruno | G06F 16/24 707/718 |
| 2016/0253385 A1* | 9/2016 | Thombre | G06F 16/24542 707/718 |
| 2017/0147639 A1* | 5/2017 | Lee | G06F 16/24539 |
| 2018/0046675 A1* | 2/2018 | Zhou | G06F 16/24549 |
| 2018/0322154 A1 | 11/2018 | Bahry | |
| 2019/0384844 A1* | 12/2019 | Ding | G06F 16/24524 |
| 2020/0210387 A1* | 7/2020 | Brown | G06N 5/04 |

OTHER PUBLICATIONS

Article entitled "Interactive Plan Hints for Query Optimization", by Bruno et al., dated Jul. 2, 2009.*

(Continued)

*Primary Examiner* — Mahesh H Dwivedi
(74) *Attorney, Agent, or Firm* — Harrity & Harrity, LLP

(57) ABSTRACT

A device may identify a query for a database system, wherein the query is a candidate for optimization. The device may determine a first execution plan according to a first hint for executing the query and a second execution plan according to a second hint for executing the query, wherein the first execution plan is associated with a first execution time and the second execution plan is associated with a second execution time. The device may select the first execution plan or the second execution plan as a selected execution plan. The device may generate, based on selecting the selected execution plan, a profile for the query, wherein the profile is based on the selected execution plan. The database system may execute the query according to the profile.

20 Claims, 10 Drawing Sheets

100 →

105
Identify a query that is a
candidate for optimization

Tuning
Platform

| Query ID | Execution Time |
|---|---|
| 1 | 0.01 |
| 2 | 12.78 |
| 3 | 0.08 |
| 4 | 0.05 |
| 5 | 0.03 |

(56) References Cited

OTHER PUBLICATIONS

YouTube Video entitled Oracle 11g Hints Overview, by Das, Uploaded on Aug. 10, 2013, available at https://www.youtube.com/watch?v=7rBf7IVOh3A.*
Article entitled "Improve SQL Query Performance by Using Bind Variables", by Saxon, dated Aug. 27, 2015 (Year: 2015).*
Article entitled "Why SQL Bind Variables are Important", by lukaseder, dated Apr. 26, 2018 (Year: 2018).*
Article entitled "XQuery Optimization in Heterogeneous Data Integration System", by Yan et al., Copyright 2009 (Year: 2009).*
Extended European Search Report for Application No. EP20164723.7, dated Jul. 27, 2020, 11 pages.
Oracle., "17 Optimizer Hints", Oracle Database Performance Tuning Guide, Oct. 1, 2015, 43 pages, XP055573478, [retrieved on 2819-83-22] Retrieved from the internet [URL: https://web.archive.org/web/20151001013623/https://docs.oracle.com/cd/B12037_01/server.101/b10752/hintsref.htm].
Wikipedia., "Query plan—Wikipedia the free encyclopedia", Aug. 31, 2013, 3 pages, XP055266011, [retireved on Apr. 15, 2016] Retrieved from the Internet [URL: https://en.wikipedia.org/w/index.php?title=Query_plan&oldid=568323598].

* cited by examiner

| Query with Hint | Execution Time |
|---|---|
| SELECT /*+ FIRST_ROWS(10) */ drivers.name FROM cars, drivers WHERE cars.car_id = drivers.car_id AND cars.type = sedan | 1.05 |
| SELECT /*+ RULE */ drivers.name FROM cars, drivers WHERE cars.car_id = drivers.car_id AND cars.type = sedan | 14.46 |
| SELECT /*+ LEADING(cars) */ drivers.name FROM cars, drivers WHERE cars.car_id = drivers.car_id AND cars.type = sedan | 0.04 |
| ⋮ | ⋮ |

120
Determine a plurality of execution plans for the query based on a plurality of hints

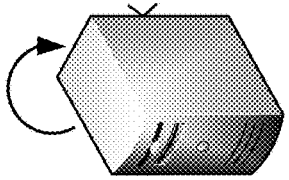

Tuning Platform

FIG. 1D

QUERY TUNING UTILIZING OPTIMIZER HINTS

BACKGROUND

Query optimization is a function of many database systems. A query optimizer of a database system attempts to determine an efficient way to execute a query submitted to the database system by considering multiple possible execution plans for the query. Some database systems permit guiding the query optimizer with hints.

SUMMARY

According to some implementations, a method may include identifying, by a device, a query for a database system. The query may be a candidate for optimization. The method may include determining, by the device, a first execution plan according to a first hint for executing the query and a second execution plan according to a second hint for executing the query. The first execution plan may be associated with a first execution time and the second execution plan may be associated with a second execution time. The method may include selecting, by the device, the first execution plan or the second execution plan as a selected execution plan. The first execution plan may be selected as the selected execution plan when the first execution time is less than the second execution time. The second execution plan may be selected as the selected execution plan when the second execution time is less than the first execution time. The method may include generating, by the device and based on selecting the selected execution plan, a profile for the query. The profile may be based on the selected execution plan. The database system may execute the query according to the profile.

According to some implementations, a non-transitory computer-readable medium may store instructions that include one or more instructions that, when executed by one or more processors of a device, cause the one or more processors to identify a query for a database system. The query may be candidate for optimization and the query may be expressed as a textual statement. The one or more instructions may cause the one or more processors to alter the textual statement with a first hint to obtain a first altered query and alter the textual statement with a second hint to obtain a second altered query. The one or more instructions may cause the one or more processors to determine a first execution plan based on processing the first altered query and determine a second execution plan based on processing the second altered query. The one or more instructions may cause the one or more processors to select the first execution plan or the second execution plan as a selected execution plan and to generate, based on selecting the selected execution plan, a profile for the query. The profile may be based on the selected execution plan. The one or more instructions may cause the one or more processors to execute the query according to the profile.

According to some implementations, a device may include one or more memories, and one or more processors, communicatively coupled to the one or more memories, to identify a query for a database system. The query may be a candidate for optimization. The one or more processors may provide, to the database system, a first hint for executing the query and a second hint for executing the query. The database system may determine a first execution plan according to the first hint for executing the query and determine a second execution plan according to the second hint for executing the query. The first execution plan may be associated with a first execution time and the second execution plan may be associated with a second execution time. The one or more processors may select the first execution plan or the second execution plan as a selected execution plan. The first execution plan may be selected as the selected execution plan when the first execution time is less than the second execution time. The second execution plan may be selected as the selected execution plan when the second execution time is less than the first execution time. The one or more processors may generate, based on selecting the selected execution plan, a profile for the query. The profile may be based on the selected execution plan. The database system may execute the query according to the profile.

BRIEF DESCRIPTION OF THE DRAWINGS

FIGS. 1A-1E are diagrams of one or more example implementations described herein.

DETAILED DESCRIPTION

Figure 1A:
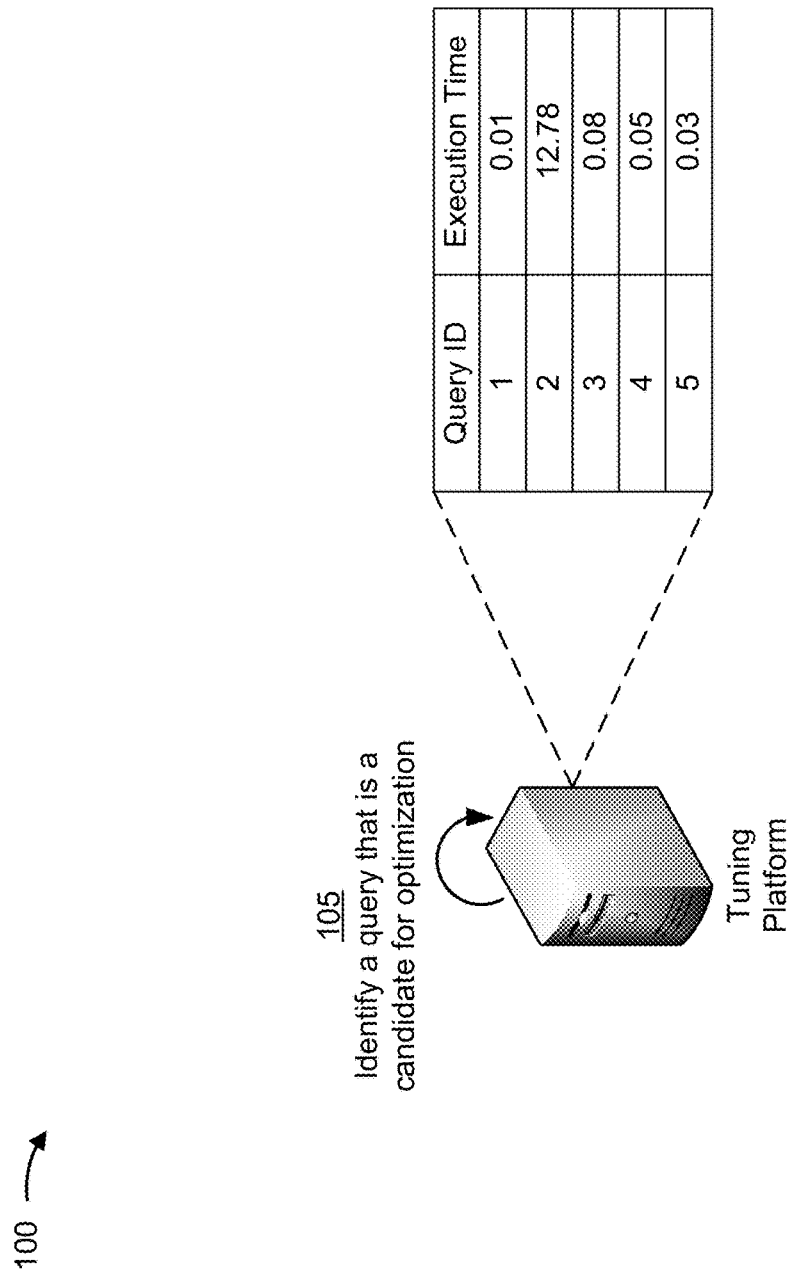

The following detailed description of example implementations refers to the accompanying drawings. The same reference numbers in different drawings may identify the same or similar elements.

A query (e.g., a structured query language (SQL) query) for a database system may identify data that is to be obtained from a database of the database system. However, the query may not define any steps or any algorithms that are to be used by the database system to obtain the data. Accordingly, the database system may employ a query optimizer to determine an efficient way to execute the query and obtain the data identified in the query. For example, the query optimizer may determine a plurality of execution plans for executing the query and select a particular execution plan (e.g., an optimal execution plan) from the plurality of execution plans.

Sometimes, the particular execution plan for the query that is determined by the query optimizer is not efficient, thereby resulting in slow execution of the query and slow execution of an application that includes the query. In such cases, a database administrator may identify the query as slow executing and attempt to optimize the query. Optimization performed by the database administrator is inefficient, error-prone, and often impractical, when there are hundreds, thousands, millions, or more queries in need of optimization. Furthermore, optimization performed by the database administrator is guided by human subjectivity, and therefore, may be difficult to repeat and may fail to arrive at a most efficient optimization of the query.

Some implementations described herein provide a tuning platform that facilitates optimization of a query for a database system. The tuning platform may identify a query that is a candidate for optimization. The tuning platform may perform a tuning procedure on the query by determining an execution plan for the query based on a hint for executing the query. The tuning platform may perform the tuning procedure on the query using a plurality of hints to determine a plurality of execution plans for the query. The tuning platform may select a particular execution plan (e.g., an optimal execution plan) from the plurality of execution plans and generate a profile for the query that is based on the particular execution plan selected. The query may be executed according to the profile.

In this way, the tuning platform removes human subjectivity and waste from query optimization, to thereby improve speed and efficiency of query optimization and conserve associated computing resources (e.g., processor resources, memory resources, and/or the like). In addition, the tuning platform performs operations, which make query optimization more efficient, that were not previously performed. Accordingly, the tuning platform is capable of optimizing hundreds, thousands, or more queries in seconds or minutes, which would otherwise require days or weeks when performed by a database administrator, thereby conserving computing resources. Moreover, the tuning platform provides for an efficient, repeatable, and unbiased analysis of a number of different potential execution plans for a query to thereby determine an optimal execution plan for the query. Accordingly, computing resources that otherwise would be wasted if the query were executed according to a less-optimal execution plan (e.g., an execution plan determined by a database administrator) are conserved.

While the description to follow will be described in terms of an example of a database system, implementations described herein may apply equally to other storage systems, such as other storage systems that may be queried.

FIGS. 1A-1E are diagrams of one or more example implementations 100 described herein. As shown in FIGS. 1A-1E, example implementation(s) 100 may include a tuning platform. The tuning platform (e.g., a tuning platform including one or more server devices) may utilize a tuning procedure to optimize queries for a database system. In some implementations, the tuning procedure may be implemented by one or more processes associated with the tuning platform (e.g., one or more processes associated with one or more computing resources of the tuning platform).

In some implementations, the database system may be associated with the tuning platform. For example, the database system may be implemented by a computing resource of the tuning platform. In some implementations, the database system may be implemented by a device (e.g., a database server device) that communicates with, or is otherwise accessible to, the tuning platform.

The database system may be a relational database management system (RDMS) that maintains a relational database. In some implementations, the database system may use SQL for querying and maintaining a database. The database system may employ a query processor (also referred to as a relational engine) that processes queries submitted to the database system. The query processor may include a query optimizer, which may determine an execution plan for executing a query, and an execution engine, which may execute the execution plan determined by the query optimizer to obtain results from a database in response to the query. For example, the query optimizer may determine an execution plan (e.g., a set of operations to produce a result requested by a query) for executing a query by generating multiple possible execution plans (e.g., multiple possible execution plans based on different combinations of access methods, such as a full table scan or an index scan; join methods, such as a nested loop join or a hash join; join orders; or query transformations).

Continuing with the previous example, the query optimizer may analyze a cost for each possible execution plan, determine a particular execution plan that has a lowest cost, and pass the particular execution plan to the execution engine. The query optimizer (e.g., using a data library of the database system) may determine a cost for an execution plan based on an estimated resource usage (e.g., input/output performance, processor usage, and/or memory usage) of the execution plan, an estimated number of rows that are to be returned (e.g., cardinality) for the query, a size of a data set relating to the query, a distribution of data relating to the query, and/or access paths for obtaining results in response to the query. In some implementations, the database system may store the particular execution plan for the query and use the particular execution plan for executing the query.

The database may be a relational database that includes one or more tables. A table may include one or more columns (e.g., attributes) and one or more rows (e.g., records). A row may be identified by a unique key. Thus, a row of a first table may be associated with a row of a second table using the unique key of the row of the first table. An index may be created on one or more columns of the table to permit the database system to find records matching a query (e.g., a query that includes a filter on a column that is indexed) without comparing the query against every row of the table.

The query may be a request to a database system to obtain one or more results from a database (e.g., a "SELECT" query), insert one or more records into the database (e.g., an "INSERT" query), update one or more records in the database (e.g., an "UPDATE" query), and/or delete one or more records from the database (e.g., a "DELETE" query). In some implementations, the query may be an SQL query. Accordingly, the query may be expressed as a textual statement (e.g., "SELECT make, model FROM cars WHERE color=red"). The query may be included in an application (e.g., an application implemented by the tuning platform) and submitted to the database system during an execution of the application.

As shown in FIG. 1A, and by reference number 105, the tuning platform may identify a query that is a candidate for optimization. In some implementations, the tuning platform may analyze historical log data (e.g., historical log data maintained by the database system) relating to queries previously executed by the database system to identify the query that is the candidate for optimization. In some implementations, the tuning platform may process one or more queries (e.g., one or more queries included in an application) within a test environment to identify the query that is the candidate for optimization. In some implementations, the tuning platform may monitor an execution of the query (e.g., in real time) to identify the query as the candidate for optimization.

In some implementations, the tuning platform may identify the query as the candidate for optimization based on a resource usage (e.g., a memory usage) and/or an execution time associated with the query. For example, the tuning platform may identify the query as the candidate for optimization when a resource usage associated with the query satisfies a threshold value and/or an execution time associated with the query satisfies a threshold value (e.g., greater than 0.1 seconds (s), 0.5 s, 1 s, and/or the like). Additionally, or alternatively, the tuning platform may identify the query as the candidate for optimization based on an identity of a database system user associated with the query. For example, the tuning platform may identify the query as the candidate for optimization when the database system user is a system administrator. Additionally, or alternatively, the tuning platform may identify the query as the candidate for optimization based on a type of the query. For example, the tuning platform may identify the query as the candidate for optimization when the query is a request to obtain one or more results from the database (e.g., a "SELECT" query). Additionally, or alternatively, the tuning platform may identify the query as the candidate for optimization based on an impact of the query on an application. For example, the tuning platform may identify the query as the candidate for optimization when a number of executions of the query in the application satisfies a threshold value and/or a percentage of executions of the query, relative to all query executions in the application, satisfies a threshold value.

In some implementations, the tuning platform may identify a plurality of queries that are candidates for optimization. The plurality of queries may be placed in a queue for processing (e.g., sequential processing or concurrent processing) by the tuning platform.

Figure 1B:
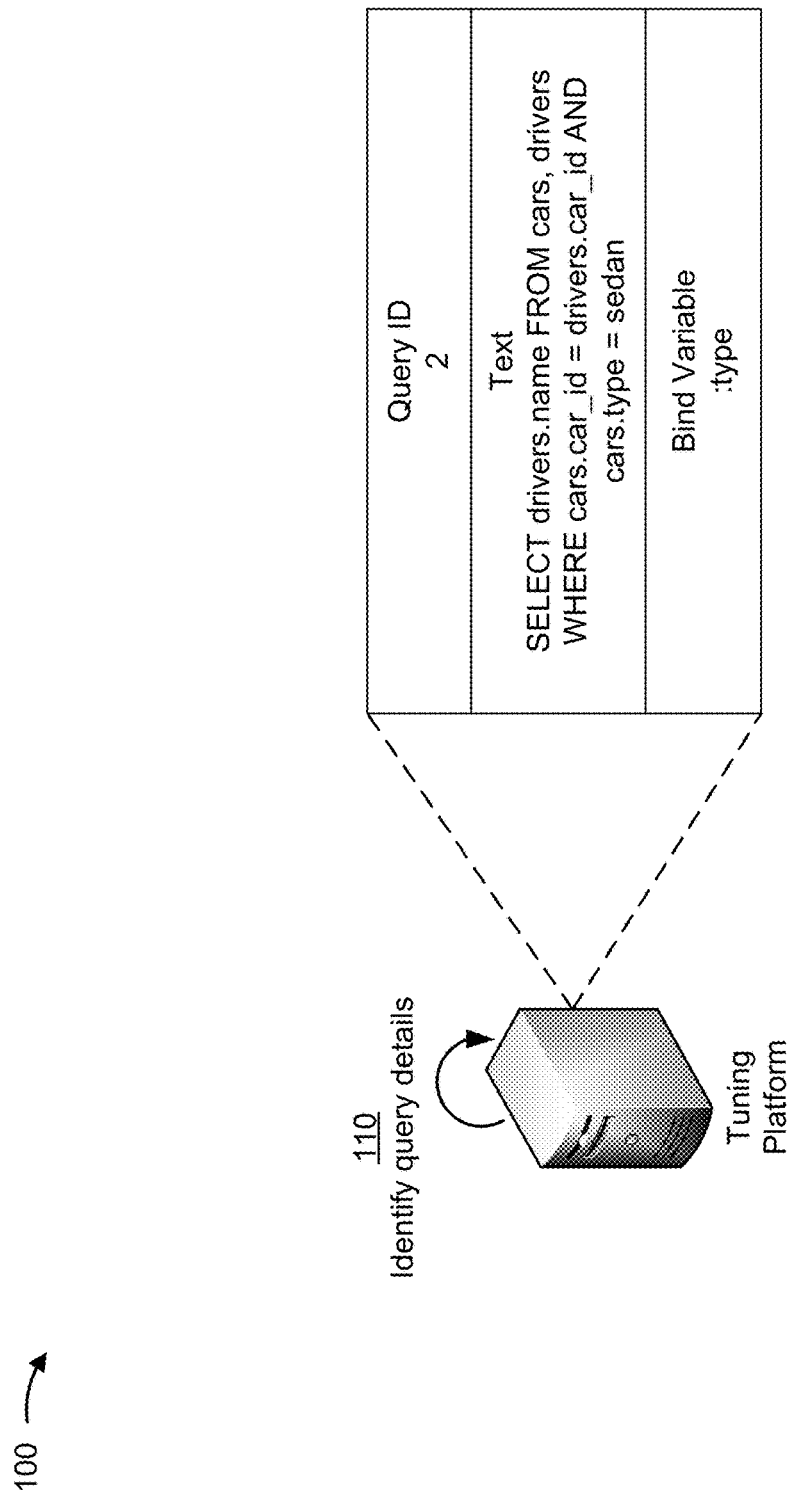

As shown in FIG. 1B, and by reference number 110, the tuning platform may identify details (e.g., metadata) of the query identified as the candidate for optimization. The tuning platform may use the details of the query in performing the tuning procedure, as described below. In some implementations, the tuning platform may identify a textual statement that expresses the query (e.g., "SELECT make, model FROM cars WHERE color=red"). Additionally, or alternatively, the tuning platform may identify one or more bind variables included in the query (e.g., in a query "SELECT make, model FROM cars WHERE color=:color," the tuning platform may identify a bind variable ":color").

Figure 1C:
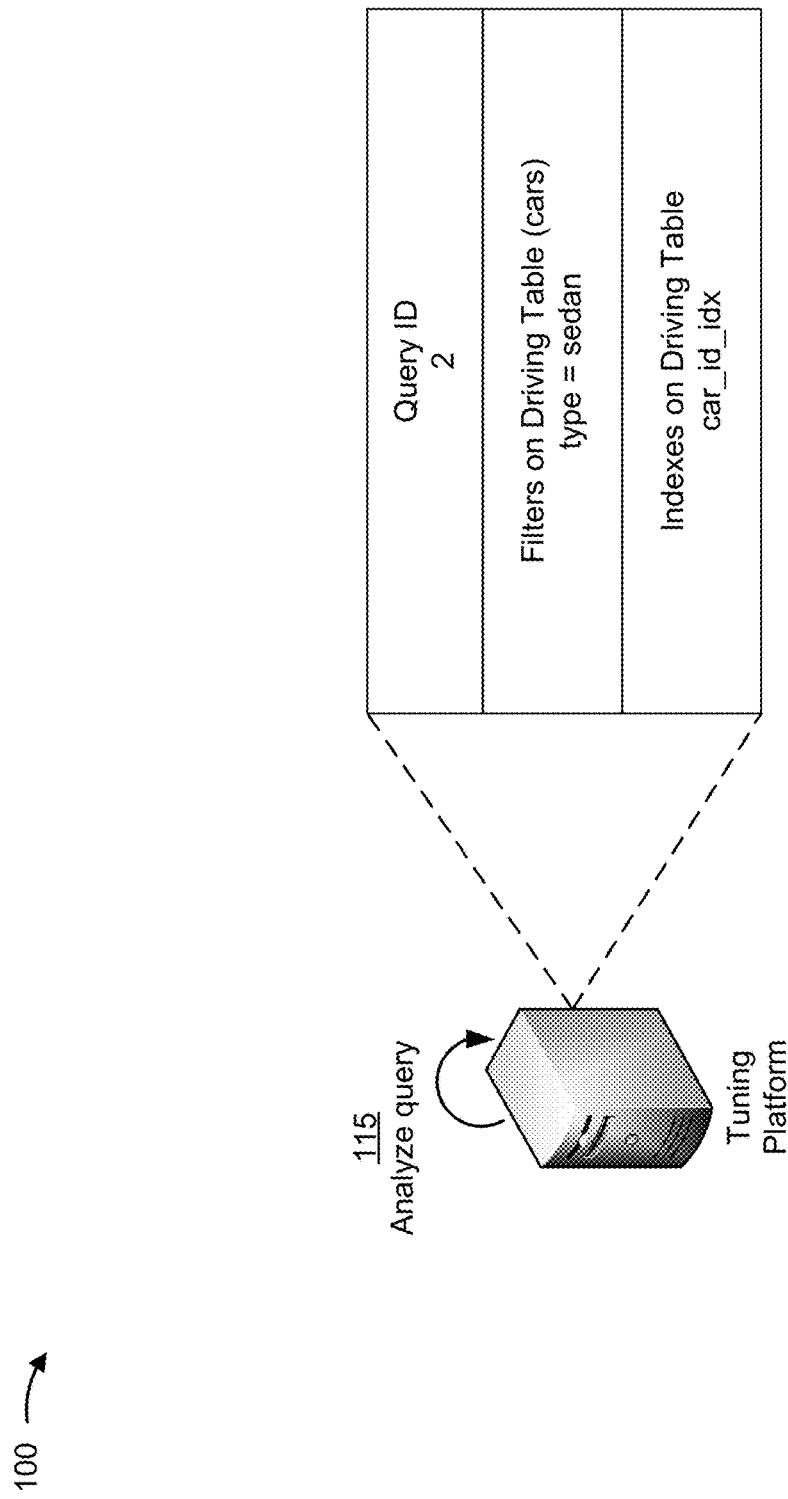

As shown in FIG. 1C, and by reference number 115, the tuning platform may analyze the query identified as the candidate for optimization. For example, the tuning platform may analyze the query to identify information relating to the query that may impact an execution of the query. The tuning platform may use the information in performing the tuning procedure, as described below. In some implementations, the tuning platform may identify a driving table (e.g., a driving table of the database) associated with the query. The tuning platform may identify the driving table by identifying a first table that is joined to one or more second tables in executing the query (e.g., a table associated with a filter condition of the query that eliminates a highest percentage of rows in the table). Additionally, or alternatively, the tuning platform may identify one or more filters of the query (e.g., in a query "SELECT make, model FROM cars WHERE color=red," the tuning platform may identify a filter "color=red"). The tuning platform may analyze a driving table that is identified and one or more filters that are identified to determine whether the one or more filters relate to columns (e.g., attributes) of the driving table. The tuning platform also may analyze data (e.g., metadata) relating to the driving table that is identified to determine columns of the driving table that are indexed by the database system.

As shown in FIG. 1D, and by reference number 120, the tuning platform may perform the tuning procedure by determining a plurality of execution plans for the query. The tuning platform may determine the plurality of execution plans according to a plurality of hints for executing the query. For example, the tuning platform may apply a hint to the query (e.g., utilizing the details of the query and the information relating to the query, as described above) and determine an execution plan for executing the query according to the hint. The tuning platform may be configured with the plurality of hints (e.g., in a list maintained by the tuning platform that may be updated periodically) that are to be applied to the query (e.g., according to the tuning procedure).

In some implementations, the tuning platform may apply a hint to the query by altering the textual statement associated with the query with the hint (e.g., "SELECT/*+FIRST_ROWS(10) */make, model FROM cars WHERE color=red") to obtain an altered query. For example, after identifying the textual statement associated with the query, the tuning platform may insert the hint into the textual statement. In some implementations, the tuning platform may alter the textual statement associated with the query with a hint and a bind variable (e.g., "SELECT/*+ FIRST_ROWS(10) */make, model FROM cars WHERE color=: color") to obtain an altered query. For example, the tuning platform may determine that textual statements for multiple queries (e.g., that are candidates for optimization) have a same structure but different literal values on a particular filter (e.g., "SELECT make, model FROM cars WHERE color=red" and "SELECT make, model FROM cars WHERE color=blue"). Continuing with the previous example, the tuning platform may generate, for the multiple queries, a combined textual statement that includes a bind variable in place of a literal value on the particular filter, and alter the combined textual statement with a hint to obtain an altered query. In some implementations, the tuning platform may alter the textual statement associated with the query with multiple hints and/or multiple bind variables to obtain an altered query.

In some implementations, the tuning platform (e.g., according to the tuning procedure) may determine an execution plan according to a hint. For example, the tuning platform (e.g., utilizing the query optimizer of the database system) may determine the execution plan based on processing an altered query that includes the hint. In some implementations, the tuning platform may provide a hint (e.g., via an altered query) to the database system to permit the database system (e.g., the query optimizer of the database system) to determine an execution plan according to the hint. In some implementations, the execution plan may be associated with an execution time and/or an execution cost. For example, the tuning platform (e.g., using the database system), when processing an altered query to determine an execution plan, may determine an execution time and/or an execution cost associated with the execution plan.

In some implementations, the execution time may be an actual execution time associated with processing the altered query and/or the cost may be an actual cost associated with processing the altered query. Additionally, or alternatively, the execution time may be an estimated execution time based on the execution plan and/or the cost may be an estimated cost based on the execution plan. The tuning platform may determine the estimated execution time and/or the estimated execution cost based on an estimated resource usage (e.g., input/output performance, processor usage, and/or memory usage) of the execution plan, an estimated number of rows that are to be returned (e.g., cardinality) for the query, a size of a data set relating to the query, a distribution of data relating to the query, and/or access paths for obtaining results in response to the query.

In some implementations, the tuning platform may determine a plurality of execution plans for the query according to a plurality of hints (e.g., a plurality of hints that are applied to the query as an individual hint and/or in a combination of hints). For example, the tuning platform may process a plurality of altered queries to determine the plurality of execution plans.

A hint may provide a directive for determining an execution plan for the query. For example, the hint may provide a directive to the query optimizer of the database system for determining an execution plan for the query. The directive may influence the query optimizer to determine an execution plan for the query in a particular manner.

In some implementations, a hint may provide a directive to determine an execution plan based on a particular number of rows that are to be returned in response to the query (e.g., "/*+ FIRST_ROWS(n) */"). In other words, the hint directs the query optimizer to determine an execution plan for the query that is optimized for returning a first "n" number of rows that are responsive to the query. In some implementations, multiple hints may specify different numbers of rows (e.g., a first hint may specify that 1 row is to be returned, a second hint may specify that 5 rows are to be returned, and/or the like).

In some implementations, a hint may provide a directive to determine an execution plan based on a rule based optimization (e.g., "/*+ RULE */"). In other words, the hint directs the query optimizer to determine an execution plan for the query that is optimized using a rule based optimization rather than a cost based optimization (e.g., a cost based optimization that determines an execution plan based on a cost of the execution plan, as described above). According to the rule based optimization, the query optimizer may determine an execution plan for the query based on a set of rules that define parameters for determining the execution plan.

In some implementations, a hint may provide a directive to determine an execution plan based on a particular table join order. In other words, the hint directs the query optimizer to determine an execution plan for the query that is optimized for a particular table join order. The particular table join order may relate to one or more particular tables that are to be used first in a table join order (e.g., "/*+ LEADING(table1 table2) */"). In some implementations, the particular table may be a driving table of the query (e.g., a driving table identified by analyzing the query, as described above). In some implementations, multiple hints may specify different tables (e.g., different tables identified by analyzing the query) that are to be used first in a table join order (e.g., a first hint may specify that a first table is to be used first in a table join order, a second hint may specify that a second table is to be used first in a table join order, and/or the like).

In some implementations, a hint may provide a directive to determine an execution plan based on a particular index that is to be used for an index scan (e.g., "/*+ INDEX(table index) */"). In other words, the hint directs the query optimizer to determine an execution plan for the query that is optimized for performing an index scan on a particular index. In some implementations, the particular index may be an index on a driving table of the query (e.g., an index identified by analyzing the query, as described above). In such cases, the hint may provide a directive to determine an execution plan based on a particular driving table and a particular index that is to be used for an index scan (e.g., "/*+ LEADING(table) INDEX(table index) */"). In some implementations, multiple hints may specify different indexes (e.g., different indexes identified by analyzing the query) that are to be used for an index scan (e.g., a first hint may specify that a first index is to be used for an index scan, a second hint may specify that a second index is to be used for an index scan, and/or the like).

In some implementations, a hint may provide a directive to determine an execution plan based on a parallel processing of the query using a particular degree of parallelism (e.g., "/*+ PARALLEL(n) */"). In other words, the hint directs the query optimizer to determine an execution plan for the query that is optimized for processing the query using an "n" number of processors. In some implementations, multiple hints may specify different degrees of parallelism (e.g., a first hint may specify that 2 processors are to process the query, a second hint may specify that 5 processors are to process the query, and/or the like).

In some implementations, a hint may provide a directive to determine an execution plan based on a particular table that is to be used as an inner table for a nested loop join operation (e.g., "/*+ USE_NL(table) */"). In other words, the hint directs the query optimizer to determine an execution plan for the query that is optimized for a particular table that is joined to another row source (e.g., table) using a nested loop join operation. In some implementations, the particular table may be a driving table of the query (e.g., a driving table identified by analyzing the query, as described above). In some implementations, multiple hints may specify different tables (e.g., different tables identified by analyzing the query) that are to be used as an inner table for a nested loop join operation (e.g., a first hint may specify that a first table is to be the inner table for the nested loop join operation, a second hint may specify that a second table is to be the inner table for the nested loop join operation, and/or the like).

In some implementations, a hint may provide a directive to determine an execution plan according to a particular access path for obtaining results in response to the query. In other words, the hint directs the query optimizer to determine an execution plan for the query that is optimized for using a particular access path. In some implementations, the particular access path may be a bitmap access path (e.g., "/*+ INDEX_COMBINE(table index1 index2) */"). Additionally, or alternatively, the particular access path may be an index join access path (e.g., "/*+ INDEX_JOIN(table index1 index2) */"). In some implementations, the particular access path may relate to one or more indexes on a driving table of the query (e.g., one or more indexes identified by analyzing the query, as described above). In some implementations, multiple hints may specify different indexes (e.g., different indexes identified by analyzing the query) for the particular access path (e.g., a first hint may specify one or more first indexes for a first access path, a second hint may specify one or more second indexes for a second access path, and/or the like).

In some implementations, a hint may provide a directive to determine an execution plan according to a particular index that is to be used for an index scan in a sort direction (e.g., "/*+ INDEX_DESC(table index) */" or "/*+ INDEX_ASC(table index) */"). In other words, the hint directs the query optimizer to determine an execution plan for the query that is optimized for performing an index scan on a particular index in a particular sort direction (e.g., optimized for scanning index entries in descending order or ascending order). In some implementations, the particular index may be an index on a driving table of the query (e.g., an index identified by analyzing the query, as described above). In some implementations, multiple hints may specify different indexes (e.g., different indexes identified by analyzing the query) that are to be used for an index scan in a sort direction (e.g., a first hint may specify that a first index is to be used for an index scan in descending order, a second hint may specify that a second index is to be used for an index scan in descending order, and/or the like).

The hints described above are illustrative and are not intended to be an exhaustive list. Accordingly, the tuning platform may employ one or more hints not described herein in performing the tuning procedure.

Figure 1E:
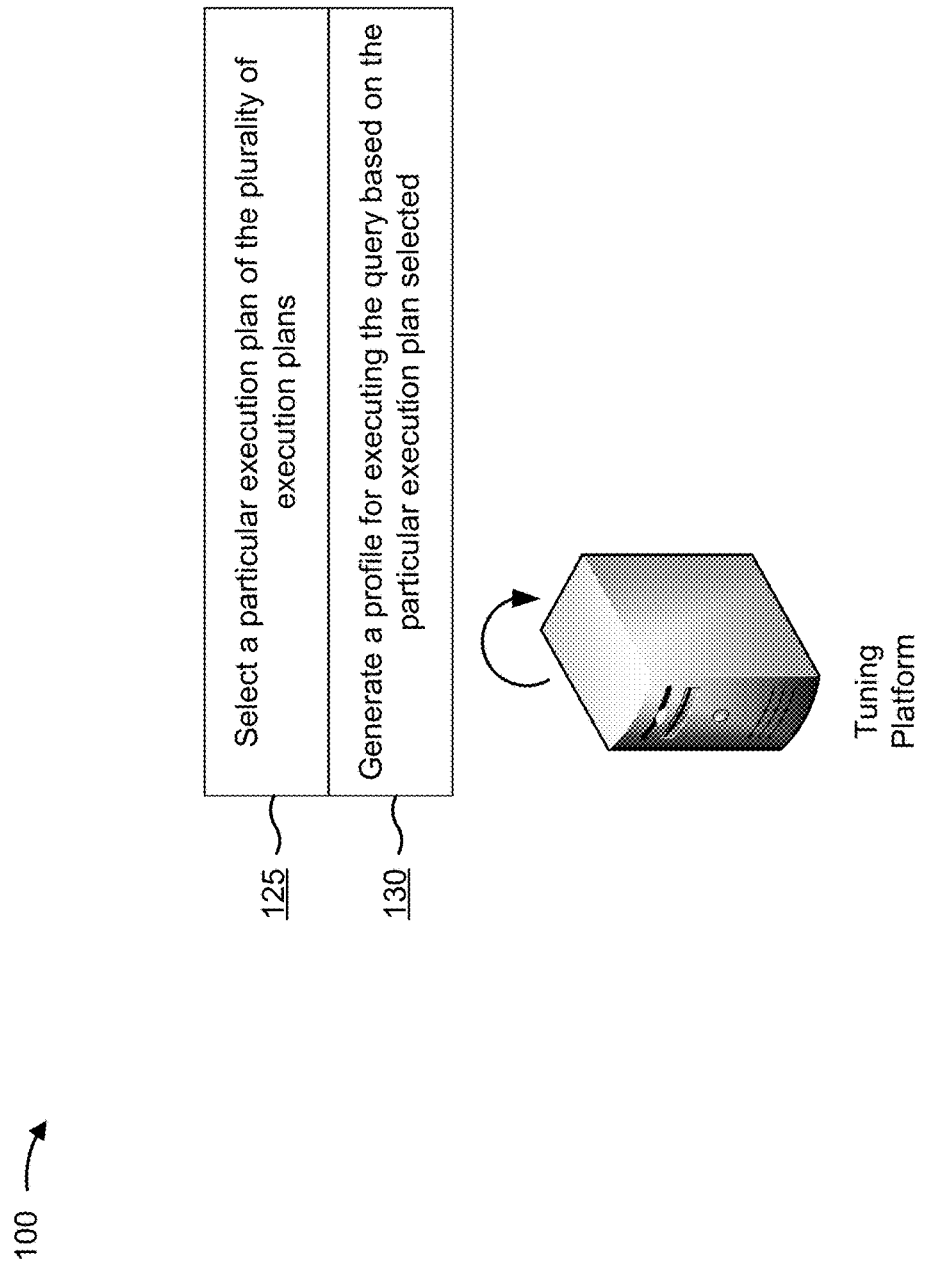

As shown in FIG. 1E, and by reference number 125, the tuning platform (e.g., according to the tuning procedure) may select a particular execution plan from a plurality of execution plans (e.g., a plurality of execution plans determined by the tuning platform based on a plurality of hints). For example, the tuning platform may select the particular execution plan based on an execution time associated with the particular execution plan, a cost associated with the particular execution plan, a structure associated with the query, a storage location of the query, and/or the like. In some implementations, the tuning platform may select the particular execution plan from the plurality of execution plans based on determining that the particular execution plan is an optimal execution plan among the plurality of execution plans.

In some implementations, the tuning platform may select the particular execution plan when the execution time or the cost associated with the particular execution plan is a lowest time or a lowest cost, respectively, among the plurality of execution plans. For example, a first execution plan may be associated with a first execution time and a second execution plan may be associated with a second execution time, and the tuning platform may select the first execution plan when the first execution time is less than the second execution time or may select the second execution plan when the second execution time is less than the first execution time. As another example, a first execution plan may be associated with a first cost and a second execution plan may be associated with a second cost, and the tuning platform may select the first execution plan when the first cost is less than the second cost or may select the second execution plan when the second cost is less than the first cost. As a further example, a first execution plan may be associated with a first execution time and a first cost and a second execution plan may be associated with a second execution time and a second cost, and the tuning platform may select the first execution plan or the second execution plan based on a first combination (e.g., a weighted combination) of the first execution time and the first cost and a second combination (e.g., a weighted combination) of the second execution time and the second cost.

In some implementations, the tuning platform may consider a plurality of factors (including or not including an execution time factor and/or a cost factor) to determine which execution plan to select. The plurality of factors, associated with an execution plan, may be weighted and combined to generate a score for the execution plan. The tuning platform may select an execution plan from the plurality of execution plans based on the score for the execution plan relative to the scores for the rest of the plurality of execution plans.

In some implementations, the tuning platform may calculate a percentage improvement of an execution time or a cost associated with an execution plan relative to an initial execution time or initial cost, respectively, associated with an initial execution plan for the query (e.g., an initial execution plan determined prior to the query being identified as the candidate for optimization). The tuning platform may select a particular execution plan that is associated with a highest percentage improvement from among a plurality of execution plans. In some implementations, the tuning platform may select the particular execution plan when the percentage improvement is the highest percentage improvement and the percentage improvement satisfies a threshold value.

In some implementations, the tuning platform may not select a particular execution plan from a plurality of execution plans. For example, the tuning platform may not select the particular execution plan when an initial execution time associated with an initial execution plan for the query (e.g., an initial execution plan determined prior to the query being identified as the candidate for optimization) is less than respective execution times for the plurality of execution plans. As another example, the tuning platform may not select the particular execution plan when an initial cost associated with an initial execution plan for the query (e.g., an initial execution plan determined prior to the query being identified as the candidate for optimization) is less than respective costs for the plurality of execution plans.

The tuning platform, based on not selecting the particular execution plan, may generate a notification indicating that an execution plan was not selected. The notification may include an identifier of the query and/or information relating to execution plans of the plurality of execution plans (e.g., steps of an execution plan, a cost associated with the execution plan, an execution time associated with the execution plan, and/or the like). The notification may be intended for, and/or transmitted to, a database administrator to thereby permit the database administrator to perform an optimization of the query.

As shown by reference number 130, the tuning platform (e.g., according to the tuning procedure) may generate a profile for the query based on the particular execution plan selected. In some implementations, the tuning platform may cause the database system to generate the profile for the query. The profile may include information that identifies the particular execution plan selected. In this way, the profile may permit the database system to process a subsequent request to execute the query according to the profile to thereby improve speed and efficiency.

In some implementations, the profile may include information that identifies a hint associated with the particular execution plan selected. Additionally, or alternatively, the profile may include database information relevant to the particular execution plan selected (e.g., a number of rows in a table related to the query, a size of a table related to the query, one or more indexes of a table related to the query, a driving table to be used for executing the query, one or more indexes to be used for executing the query, and/or the like). In such cases, the profile may permit the database system to determine an execution plan for the query (e.g., an execution plan that is different from the particular execution plan selected) according to the hint and/or the database information each time the query is submitted to the database system. This may be useful, for example, when changes to the database (e.g., changes to a size of the database, such as a number of rows in a table of the database) have occurred since the particular execution plan was selected.

The tuning platform may store, or cause the database system to store, the profile in a data structure (e.g., a database, a linked list, a table, and/or the like). In some implementations, the database system may execute the query according to the profile. For example, the database system may receive a request to execute the query (e.g., from an application that includes the query), obtain the profile for the query, and execute the query according to the profile.

In some implementations, the tuning platform may periodically perform the tuning procedure. For example, the tuning platform may periodically perform the tuning procedure according to a schedule (e.g., once a day, once a week, once a month, and/or the like). As another example, the tuning platform may periodically perform the tuning procedure at times when the tuning platform determines that query optimization may improve an efficiency of an application and/or the database system. For example, the tuning platform may monitor a resource usage of the application and/or the database system and perform the tuning procedure when the resource usage satisfies a threshold value. As another example, the tuning platform may monitor an execution time of a query and perform the tuning procedure on the query when the execution time satisfies a threshold value, as described above.

As indicated above, FIGS. 1A-1E are provided merely as one or more examples. Other examples may differ from what is described with regard to FIGS. 1A-1E.

Figure 2:
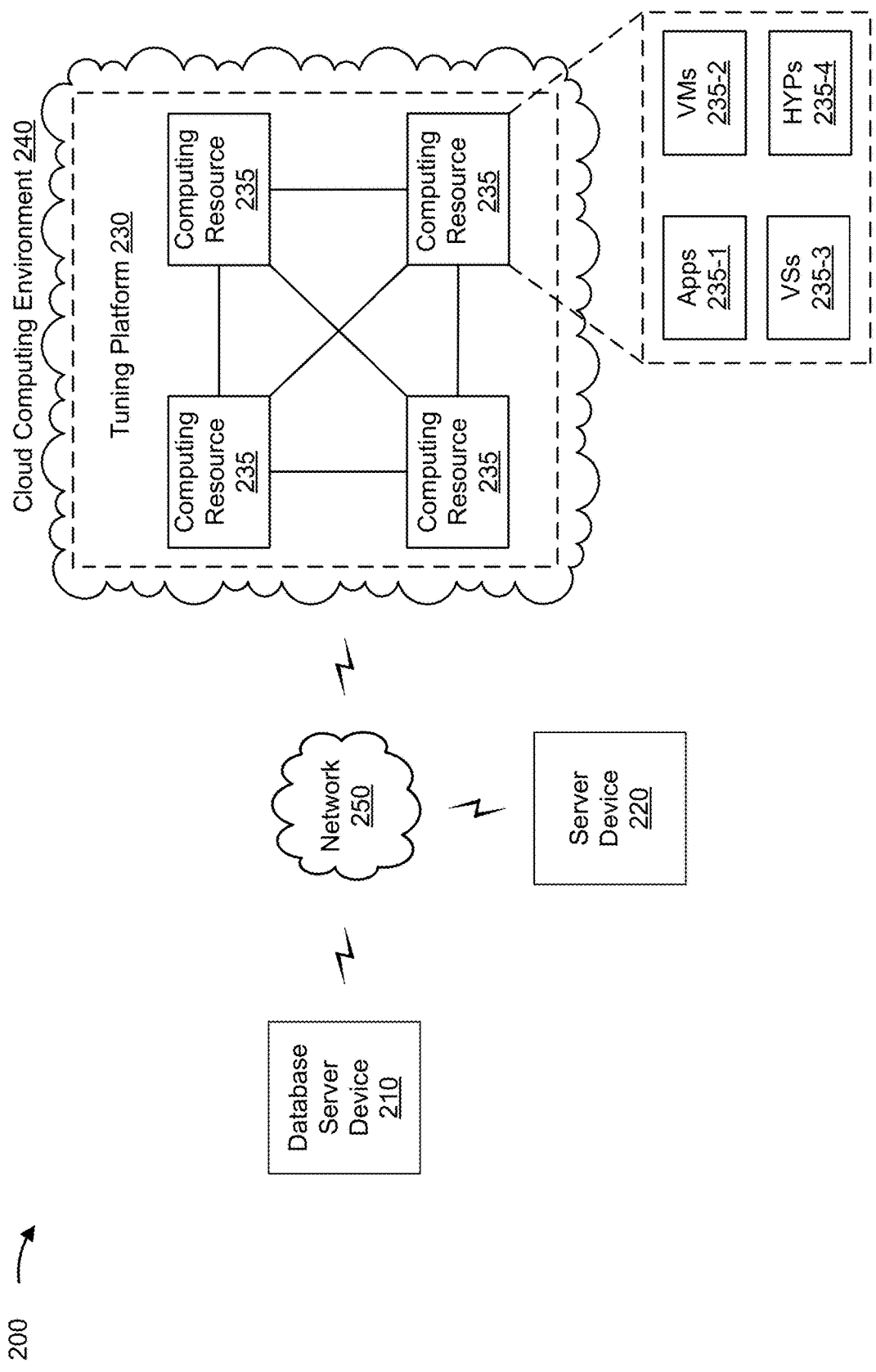
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a database server device 210, a server device 220, a tuning platform 230, a computing resource 235, a cloud computing environment 240, and a network 250. Devices of environment 200 may interconnect via wired connections, wireless connections, or a combination of wired and wireless connections.

Database server device 210 includes one or more devices capable of storing, processing, and/or routing information associated with a database system. In some implementations, database server device 210 may include a communication interface that allows database server device 210 to receive information from and/or transmit information to other devices in environment 200.

Server device 220 includes one or more devices capable of storing, processing, and/or routing information associated with an application (e.g., an application that includes one or more queries for a database system). In some implementations, server device 220 may include a communication interface that allows server device 220 to receive information from and/or transmit information to other devices in environment 200.

Tuning platform 230 includes one or more computing resources associated with performing a tuning procedure on queries that are candidates for optimization. For example, tuning platform 230 may be a platform implemented by cloud computing environment 240 that may identify a query that is a candidate for optimization, determine a plurality of execution plans for the query according to a plurality of hints, select an execution plan from the plurality of execution plans, generate a profile for the query based on the execution plan selected, and/or the like.

Tuning platform 230 can include one or more server devices. In some implementations, tuning platform 230 is implemented by computing resources 235 of cloud computing environment 240. Notably, while implementations described herein describe tuning platform 230 as being hosted in cloud computing environment 240, in some implementations, tuning platform 230 might not be cloud-based or can be partially cloud-based.

Cloud computing environment 240 includes an environment that delivers computing as a service, whereby shared resources, services, etc. may be provided to database server device 210, server device 220, and the like. Cloud computing environment 240 may provide computation, software, data access, storage, and/or other services that do not require end-user knowledge of a physical location and configuration of a system and/or a device that delivers the services. As shown, cloud computing environment 240 may include tuning platform 230 and computing resource 235.

Computing resource 235 includes one or more personal computers, workstation computers, server devices, or another type of computation and/or communication device.

In some implementations, computing resource 235 may host tuning platform 230, a database system, and/or an application. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by database server device 210, server device 220, and/or the like. Application 235-1 may eliminate a need to install and execute the software applications on database server device 210, server device 220, and/or the like. For example, application 235-1 may include software associated with tuning platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., database server device 210, server device 220, and/or the like), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
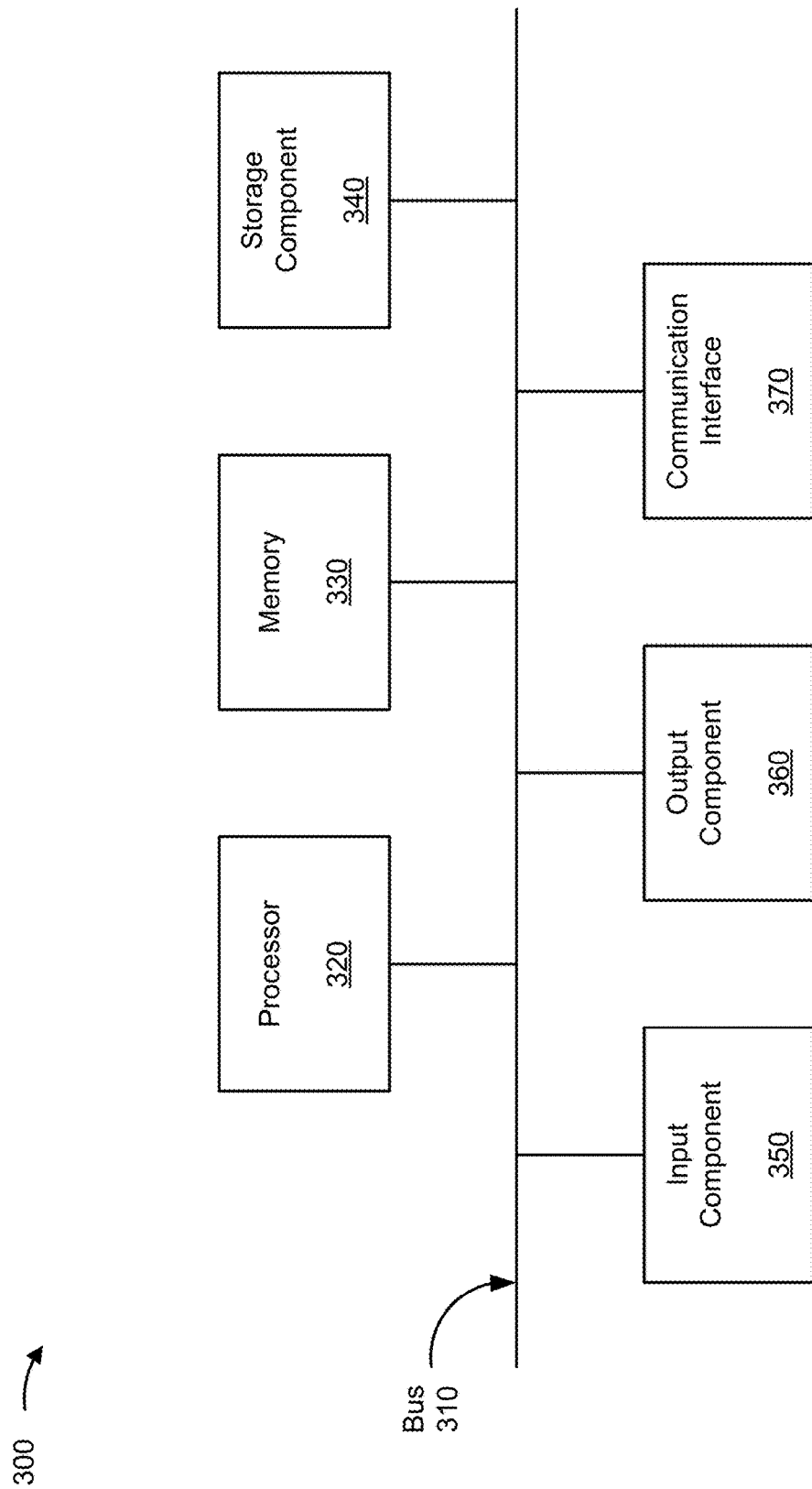
FIG. 3 is a diagram of example components of one or more devices of FIG. 2.

FIG. 3 is a diagram of example components of a device 300. Device 300 may correspond to database server device 210, server device 220, tuning platform 230, and/or computing resource 235. In some implementations, database server device 210, server device 220, tuning platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
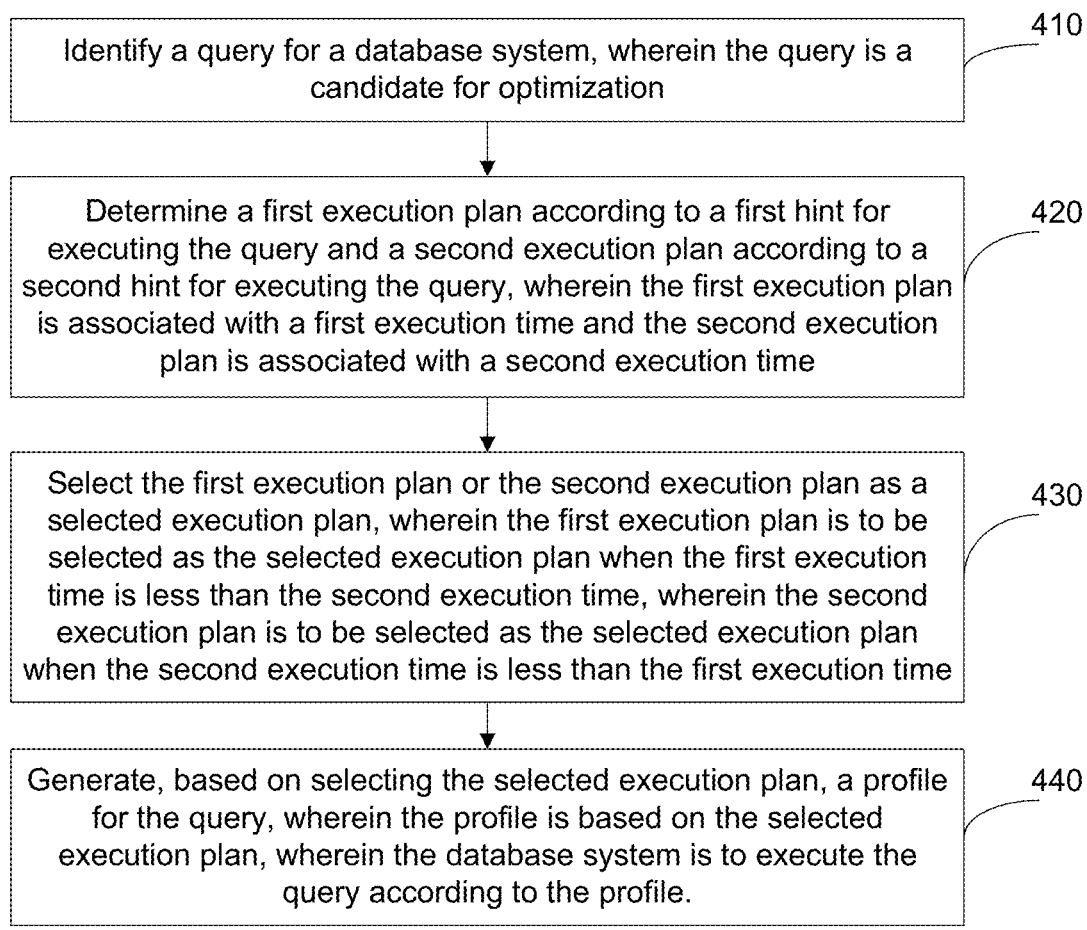
FIGS. 4-6 are flow charts of example processes for query tuning utilizing optimizer hints.

FIG. 4 is a flow chart of an example process 400 for query tuning utilizing optimizer hints. In some implementations, one or more process blocks of FIG. 4 may be performed by a tuning platform (e.g., tuning platform 230). In some implementations, one or more process blocks of FIG. 4 may be performed by another device or a group of devices separate from or including the tuning platform, such as a database server device (e.g., database server device 210), a server device (e.g., server device 220), and/or the like.

As shown in FIG. 4, process 400 may include identifying a query for a database system, wherein the query is a candidate for optimization (block 410). For example, the tuning platform (e.g., using computing resource 235, processor 320, memory 330, storage component 340, and/or the like) may identify a query for a database system, as described above. In some implementations, the query is a candidate for optimization.

As further shown in FIG. 4, process 400 may include determining a first execution plan according to a first hint for executing the query and a second execution plan according to a second hint for executing the query, wherein the first execution plan is associated with a first execution time and the second execution plan is associated with a second execution time (block 420). For example, the tuning platform (e.g., using computing resource 235, processor 320, memory 330, storage component 340, and/or the like) may determine a first execution plan according to a first hint for executing the query and a second execution plan according to a second hint for executing the query, as described above. In some implementations, the first execution plan is associated with a first execution time and the second execution plan is associated with a second execution time.

As further shown in FIG. 4, process 400 may include selecting the first execution plan or the second execution plan as a selected execution plan, wherein the first execution plan is to be selected as the selected execution plan when the first execution time is less than the second execution time, and wherein the second execution plan is to be selected as the selected execution plan when the second execution time is less than the first execution time (block 430). For example, the tuning platform (e.g., using computing resource 235, processor 320, memory 330, storage component 340, and/or the like) may select the first execution plan or the second execution plan as a selected execution plan, as described above. In some implementations, the first execution plan is to be selected as the selected execution plan when the first execution time is less than the second execution time. In some implementations, the second execution plan is to be selected as the selected execution plan when the second execution time is less than the first execution time.

As further shown in FIG. 4, process 400 may include generating, based on selecting the selected execution plan, a profile for the query, wherein the profile is based on the selected execution plan, and wherein the database system is to execute the query according to the profile (block 440). For example, the tuning platform (e.g., using computing resource 235, processor 320, memory 330, storage component 340, and/or the like) may generate, based on selecting the selected execution plan, a profile for the query, as described above. In some implementations, the profile is based on the selected execution plan. In some implementations, the database system is to execute the query according to the profile.

Process 400 may include additional implementations, such as any single implementation or any combination of implementations described below and/or in connection with one or more other processes described elsewhere herein.

In some implementations, the query, prior to being identified as the candidate for optimization, may be executed according to an initial execution plan that is associated with an initial execution time, and the query may be identified as the candidate for optimization when the initial execution time satisfies a threshold value. In some implementations, the tuning platform, when determining the first execution plan and the second execution plan, may determine the first execution plan and the second execution plan using a query optimizer of the database system.

In some implementations, the query may be expressed as a textual statement. In some implementations, the tuning platform when determining the first execution plan and the second execution plan may alter the textual statement with the first hint to obtain a first altered query and alter the textual statement with the second hint to obtain a second altered query, and determine the first execution plan based on processing the first altered query and determine the second execution plan based on processing the second altered query.

In some implementations, the tuning platform may determine a driving table associated with the query, where the first hint or the second hint is related to the driving table. In some implementations, the tuning platform may determine one or more indexes of a driving table associated with the query, where the first hint or the second hint is related to the one or more indexes.

In some implementations, the first hint provides a first directive to determine the first execution plan, and the second hint provides a second directive to determine the second execution plan, according to one or more of a particular number of rows that are to be returned, a rule based optimization, a particular table that is to be used first in a table join order, a particular index that is to be used for an index scan, a parallel processing using a particular number of processors, a particular table that is to be used as an inner table of a nested loop join operation, a particular access path, or a particular index that is to be used for an index scan in a particular sort direction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
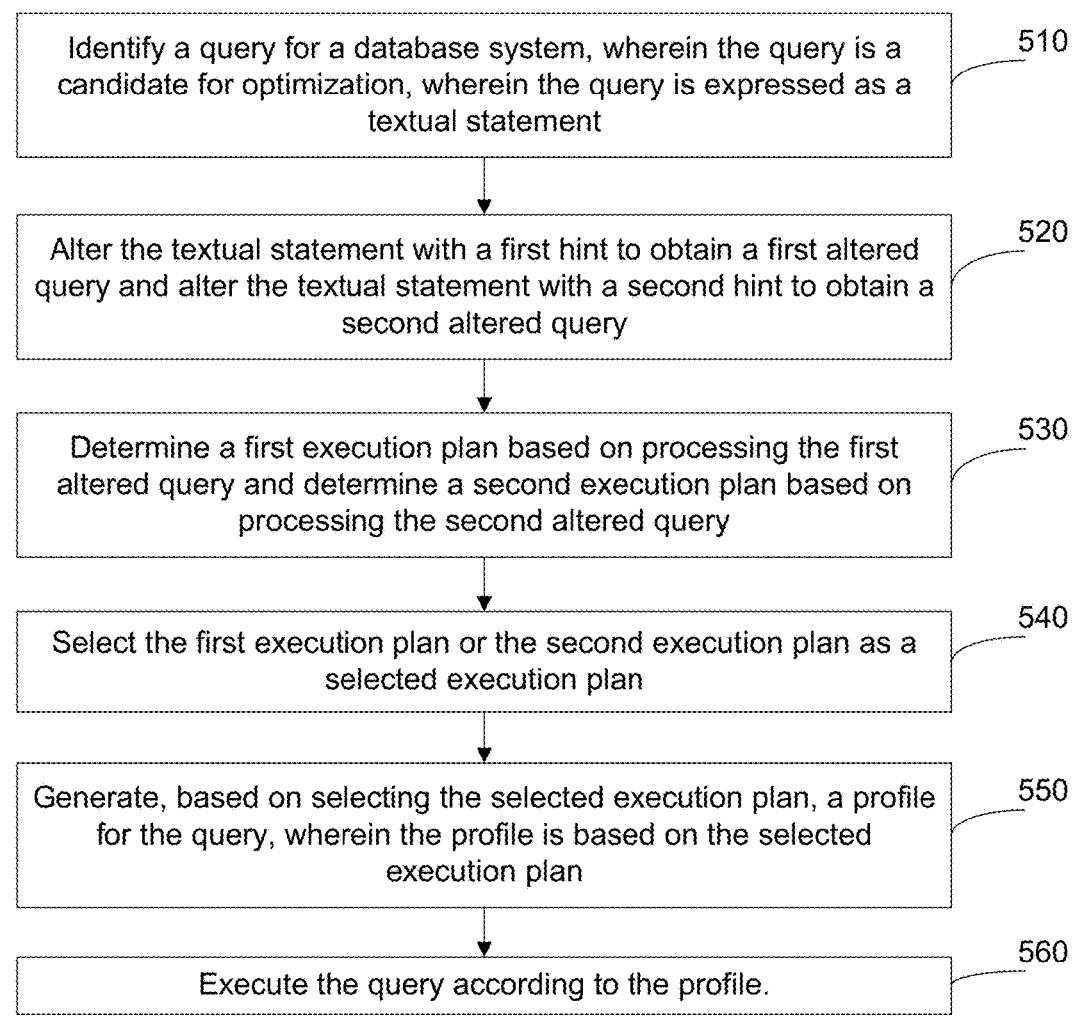

FIG. 5 is a flow chart of an example process 500 for query tuning utilizing optimizer hints. In some implementations, one or more process blocks of FIG. 5 may be performed by a tuning platform (e.g., tuning platform 230). In some implementations, one or more process blocks of FIG. 5 may be performed by another device or a group of devices separate from or including the tuning platform, such as a database server device (e.g., database server device 210), a server device (e.g., server device 220), and/or the like.

As shown in FIG. 5, process 500 may include identifying a query for a database system wherein the query is a candidate for optimization (block 510). For example, the tuning platform (e.g., using computing resource 235, processor 320, memory 330, storage component 340, and/or the like) may identify a query for a database system, as described above. In some implementations, the query is a candidate for optimization.

As further shown in FIG. 5, process 500 may include altering the textual statement with a first hint to obtain a first altered query and altering the textual statement with a second hint to obtain a second altered query (block 520). For example, the tuning platform (e.g., using computing resource 235, processor 320, memory 330, storage component 340, and/or the like) may alter the textual statement with a first hint to obtain a first altered query and alter the textual statement with a second hint to obtain a second altered query, as described above.

As further shown in FIG. 5, process 500 may include determining a first execution plan based on processing the first altered query and determining a second execution plan based on processing the second altered query (block 530). For example, the tuning platform (e.g., using computing resource 235, processor 320, memory 330, storage component 340, and/or the like) may determine a first execution plan based on processing the first altered query and determine a second execution plan based on processing the second altered query, as described above.

As further shown in FIG. 5, process 500 may include selecting the first execution plan or the second execution plan as a selected execution plan (block 540). For example, the tuning platform (e.g., using computing resource 235, processor 320, memory 330, storage component 340, and/or the like) may select the first execution plan or the second execution plan as a selected execution plan, as described above.

As further shown in FIG. 5, process 500 may include generating, based on selecting the selected execution plan, a profile for the query, wherein the profile is based on the selected execution plan (block 550). For example, the tuning platform (e.g., using computing resource 235, processor 320, memory 330, storage component 340, and/or the like) may generate, based on selecting the selected execution plan, a profile for the query, as described above. In some implementations, the profile is based on the selected execution plan.

As further shown in FIG. 5, process 500 may include executing the query according to the profile (block 560). For example, the tuning platform (e.g., using computing resource 235, processor 320, memory 330, storage component 340, and/or the like) may execute the query according to the profile, as described above.

Process 500 may include additional implementations, such as any single implementation or any combination of implementations described below and/or in connection with one or more other processes described elsewhere herein.

In some implementations, the query, prior to being identified as the candidate for optimization, is executed according to an initial execution plan that is associated with an initial execution time, and the query may be identified as the candidate for optimization when the initial execution time satisfies a threshold value. In some implementations, the tuning platform may store the profile in association with the query. In some implementations, the tuning platform may receive an instruction to execute the query, obtain the profile, and execute the query according to the profile. In some implementations, the tuning platform, when selecting the first execution plan or the second execution plan as the selected execution plan, may select neither of the first execution plan and the second execution plan as the selected execution plan and generate a notification indicating that an execution plan was not selected for the query.

In some implementations, the first execution plan or the second execution plan is selected as the selected execution plan based on a storage location of the query. In some implementations, the tuning platform, when selecting the first execution plan or the second execution plan as the selected execution plan, may select the first execution plan or the second execution plan as the selected execution plan based on a first execution time or cost associated with the first altered query or based on a second execution time or cost associated with the second altered query.

In some implementations, the first hint provides a first directive to determine the first execution plan, and the second hint provides a second directive to determine the second execution plan, according to one or more of a particular number of rows that are to be returned, a rule based optimization, a particular table that is to be used first in a table join order, a particular index that is to be used for an index scan, a parallel processing using a particular number of processors, a particular table that is to be used as an inner table of a nested loop join operation, a particular access path, or a particular index that is to be used for an index scan in a particular sort direction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
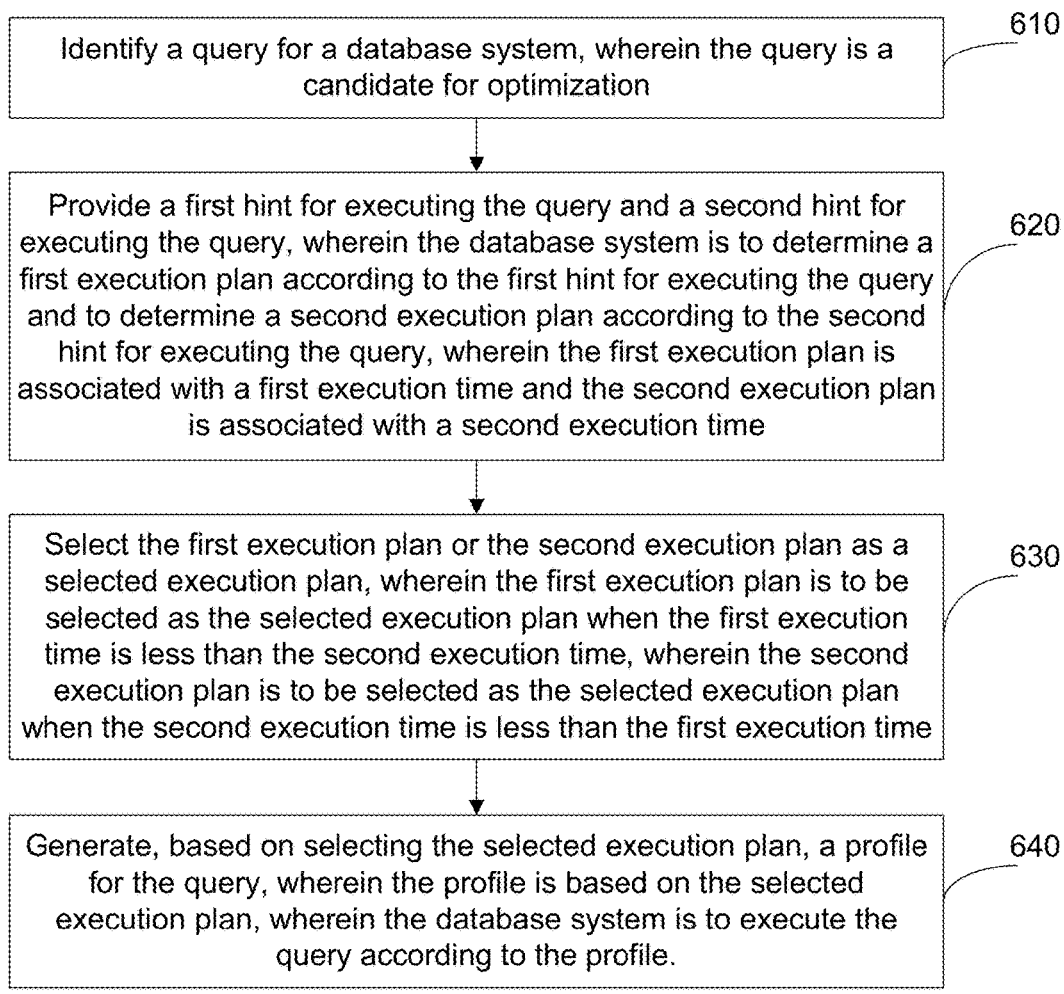

FIG. 6 is a flow chart of an example process 600 for query tuning utilizing optimizer hints. In some implementations, one or more process blocks of FIG. 6 may be performed by a tuning platform (e.g., tuning platform 230). In some implementations, one or more process blocks of FIG. 6 may be performed by another device or a group of devices separate from or including the tuning platform, such as a database server device (e.g., database server device 210), a server device (e.g., server device 220), and/or the like.

As shown in FIG. 6, process 600 may include identifying a query for a database system, wherein the query is a candidate for optimization (block 610). For example, the tuning platform (e.g., using computing resource 235, processor 320, memory 330, storage component 340, and/or the like) may identify a query for a database system, as described above. In some implementations, the query is a candidate for optimization.

As further shown in FIG. 6, process 600 may include providing a first hint for executing the query and a second hint for executing the query, wherein the database system is to determine a first execution plan according to the first hint for executing the query and to determine a second execution plan according to the second hint for executing the query, and wherein the first execution plan is associated with a first execution time and the second execution plan is associated with a second execution time (block 620). For example, the tuning platform (e.g., using computing resource 235, processor 320, memory 330, storage component 340, and/or the like) may provide a first hint for executing the query and a second hint for executing the query, as described above. In some implementations, the database system is to determine a first execution plan according to the first hint for executing the query and to determine a second execution plan according to the second hint for executing the query. In some implementations, the first execution plan is associated with a first execution time and the second execution plan is associated with a second execution time.

As further shown in FIG. 6, process 600 may include selecting the first execution plan or the second execution plan as a selected execution plan, wherein the first execution plan is to be selected as the selected execution plan when the first execution time is less than the second execution time, and wherein the second execution plan is to be selected as the selected execution plan when the second execution time is less than the first execution time (block 630). For example, the tuning platform (e.g., using computing resource 235, processor 320, memory 330, storage component 340, and/or the like) may select the first execution plan or the second execution plan as a selected execution plan, as described above. In some implementations, the first execution plan is to be selected as the selected execution plan when the first execution time is less than the second execution time. In some implementations, the second execution plan is to be selected as the selected execution plan when the second execution time is less than the first execution time.

As further shown in FIG. 6, process 600 may include generating, based on selecting the selected execution plan, a profile for the query, wherein the profile is based on the selected execution plan, and wherein the database system is to execute the query according to the profile (block 640). For example, the tuning platform (e.g., using computing resource 235, processor 320, memory 330, storage component 340, and/or the like) may generate, based on selecting the selected execution plan, a profile for the query, as described above. In some implementations, the profile is based on the selected execution plan. In some implementations, the database system is to execute the query according to the profile.

Process 600 may include additional implementations, such as any single implementation or any combination of implementations described below and/or in connection with one or more other processes described elsewhere herein.

In some implementations, the query may be expressed as a textual statement. In some implementations, the tuning platform may alter the textual statement with the first hint to obtain a first altered query and alter the textual statement with the second hint to obtain a second altered query. In some implementations, the tuning platform, when providing the first hint and the second hint, may provide the first altered query and the second altered query.

In some implementations, the query, prior to being identified as the candidate for optimization, may be executed by the database system according to an initial execution plan that is associated with an initial execution time, and the first execution plan may be selected when the first execution time is less than the initial execution time and the second execution time, and the second execution plan may be selected when the second execution time is less than the initial execution time and the first execution time. In some implementations, the query, prior to being identified as the candidate for optimization, may be executed by the database system according to an initial execution plan that is associated with an initial execution time, and the query may be the candidate for optimization when the initial execution time satisfies a first threshold value, the query is a request to retrieve data from the database system, and a number of executions of the query in connection with an application satisfies a second threshold value.

In some implementations, the first hint and the second hint are included in a plurality of hints that may be used for determining a plurality of execution plans. In some implementations, the first hint provides a first directive to determine the first execution plan, and the second hint provides a second directive to determine the second execution plan, according to one or more of a particular number of rows that are to be returned, a particular table that is to be used first in a table join order, a particular index that is to be used for an index scan, a parallel processing using a particular number of processors, a particular table that is to be used as an inner table of a nested loop join operation, a particular access path, or a particular index that is to be used for an index scan in a particular sort direction.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   identifying, by a device, a first query and a second query for a database system,
      wherein each of the first query the second query is a textual statement and a candidate for optimization;
   determining, by the device and based on identifying the first query and the second query, that the first query and the second query have a same structure and a different literal value associated with a particular filter;
   generating, by the device and based on determining that the first query and the second query have the same structure and the different literal value, a combined textual statement having the same structure and including a bind variable in place of the different literal value;
   applying, by the device and based on generating the combined textual statement, a first hint to the combined textual statement and a second hint to the combined textual statement,
      wherein the first hint and the second hint are for executing the first query and the second query;
   determining, by the device, a first execution plan according to the first hint and a second execution plan according to the second hint,
      wherein the first execution plan is associated with a first execution time and the second execution plan is associated with a second execution time;
   selecting, by the device, the first execution plan or the second execution plan as a selected execution plan, wherein the first execution plan is to be selected as the selected execution plan when the first execution time is less than the second execution time, wherein the second execution plan is to be selected as the selected execution plan when the second execution time is less than the first execution time; and generating, by the device and based on selecting the selected execution plan, a profile for at least one of the first query or the second query, wherein the profile is based on the selected execution plan, wherein the database system is to execute the at least one of the first query or the second query according to the profile.

2. The method of claim 1, wherein the first query and the second query, prior to being identified as the candidate for optimization, are executed according to an initial execution plan that is associated with an initial execution time, wherein the first query and the second query are identified as the candidate for optimization when the initial execution time satisfies a threshold value.

3. The method of claim 1, wherein determining the first execution plan and the second execution plan comprises:

determining the first execution plan and the second execution plan using a query optimizer of the database system.

4. The method of claim 1, wherein applying the first hint and the second hint comprises:

altering the combined textual statement with the first hint to obtain a first altered query and the combined textual statement with the second hint to obtain a second altered query, and wherein determining the first execution plan and the second execution plan comprises:

determining the first execution plan based on processing the first altered query; and determining the second execution plan based on processing the second altered query.

5. The method of claim 1, further comprising:

determining a driving table associated with the at least one of the first query or the second query, wherein the at least one of the first hint or the second hint, corresponding to the at least one of the first query or the second query, is related to the driving table.

6. The method of claim 1, further comprising:

determining one or more indexes of a driving table associated with the at least one of the first query or the second query, wherein the at least one of the first hint or the second hint is related to the one or more indexes.

7. The method of claim 1, wherein the first hint provides a first directive to determine the first execution plan, and the second hint provides a second directive to determine the second execution plan, according to one or more of:

a particular number of rows that are to be returned, a rule based optimization, a particular table that is to be used first in a table join order, a particular index that is to be used for an index scan, a parallel processing using a particular number of processors, a particular table that is to be used as an inner table of a nested loop join operation, a particular access path, or a second particular index that is to be used for a second index scan in a particular sort direction.

8. A non-transitory computer-readable medium storing instructions, the instructions comprising:

one or more instructions that, when executed by one or more processors, cause the one or more processors to:

identify a first query and a second query for a database system, wherein each of the first query and the second query is a textual statement and a candidate for optimization;

determine, based on identifying the first query and the second query, that the first query and the second query have a same structure and a different literal value associated with a particular filter;

generate, based on determining that the first query and the second query have the same structure and the different literal value, a combined textual statement having the same structure and including a bind variable in place of the different literal value;

alter, based on generating the combined textual statement, the combined textual statement with a first hint to obtain a first altered query and the combined textual statement with a second hint to obtain a second altered query;

determine a first execution plan based on processing the first altered query and determine a second execution plan based on processing the second altered query;

select the first execution plan or the second execution plan as a selected execution plan;

generate, based on selecting the selected execution plan, a profile for at least one of the first query or the second query, wherein the profile is based on the selected execution plan; and execute the at least one of the first query or the second query according to the profile.

9. The non-transitory computer-readable medium of claim 8, wherein the first query and the second query, prior to being identified as the candidate for optimization, are executed according to an initial execution plan that is associated with an initial execution time, wherein the first query and the second query are identified as the candidate for optimization when the initial execution time satisfies a threshold value.

10. The non-transitory computer-readable medium of claim 8, wherein the one or more instructions, when executed by the one or more processors, further cause the one or more processors to:

store the profile in association with the at least one of the first query or the second query, wherein the one or more instructions, that cause the one or more processors to execute the at least one of the first query or the second query, cause the one or more processors to:

receive an instruction to execute the at least one of the first query or the second query;

obtain the profile; and execute the at least one of the first query or the second query according to the profile.

11. The non-transitory computer-readable medium of claim 8, wherein the one or more instructions, that cause the one or more processors to select the first execution plan or the second execution plan as the selected execution plan, cause the one or more processors to:

select neither of the first execution plan and the second execution plan as the selected execution plan; and generate a notification indicating that an execution plan was not selected for the first query and the second query.

12. The non-transitory computer-readable medium of claim 8, wherein the first execution plan or the second execution plan is selected as the selected execution plan based on a storage location of the at least one of the first query or the second query.

13. The non-transitory computer-readable medium of claim 8, wherein the one or more instructions, that cause the one or more processors to select the first execution plan or the second execution plan as the selected execution plan, cause the one or more processors to:
   select the first execution plan or the second execution plan as the selected execution plan based on a first execution time or cost associated with the first altered query or based on a second execution time or cost associated with the second altered query.

14. The non-transitory computer-readable medium of claim 8, wherein the first hint provides a first directive to determine the first execution plan, and the second hint provides a second directive to determine the second execution plan, according to one or more of:
   a particular number of rows that are to be returned,
   a rule based optimization,
   a particular table that is to be used first in a table join order,
   a particular index that is to be used for an index scan,
   a parallel processing using a particular number of processors,
   a particular table that is to be used as an inner table of a nested loop join operation,
   a particular access path, or
   a second particular index that is to be used for a second index scan in a particular sort direction.

15. A device, comprising:
   one or more memories; and
   one or more processors, communicatively coupled to the one or more memories, to:
      identify a first query and a second query for a database system,
         wherein each of the first query and the second query is a textual statement and a candidate for optimization;
      determine, based on identifying the first query and the second query, that the first query and the second query have a same structure and a different literal value associated with a particular filter;
      generate, based on determining that the first query and the second query have the same structure and the different literal value, a combined textual statement having the same structure and including a bind variable in place of the different literal value;
      apply, based on generating the combined textual statement, a first hint to the combined textual statement and a second hint to the combined textual statement,
         wherein the first hint and the second hint are for executing the first query and the second query;
      provide, to the database system, the first hint and the second hint,
         wherein the database system is to determine a first execution plan according to the first hint for executing the first query and to determine a second execution plan according to the second hint for executing the second query,
         wherein the first execution plan is associated with a first execution time and the second execution plan is associated with a second execution time;
      select the first execution plan or the second execution plan as a selected execution plan,
         wherein the first execution plan is to be selected as the selected execution plan when the first execution time is less than the second execution time,
         wherein the second execution plan is to be selected as the selected execution plan when the second execution time is less than the first execution time; and
      generate, based on selecting the selected execution plan, a profile for the at least one of the first query or the second query,
         wherein the profile is based on the selected execution plan,
         wherein the database system is to execute the at least one of the first query or the second query according to the profile.

16. The device of claim 15, wherein the one or more processors when applying the first hint and the second hint, are to:
   alter the textual statement with the first hint to obtain a first altered query and the textual statement with the second hint to obtain a second altered query,
      wherein the one or more processors, when providing the first hint and the second hint, are to:
   provide the first altered query and the second altered query.

17. The device of claim 15, wherein the at least one of the first query or the second query, prior to being identified as the candidate for optimization, is executed by the database system according to an initial execution plan that is associated with an initial execution time,
   wherein the first execution plan is to be selected when the first execution time is less than the initial execution time and the second execution time,
   wherein the second execution plan is to be selected when the second execution time is less than the initial execution time and the first execution time.

18. The device of claim 15, wherein the first query and the second query, prior to being identified as the candidate for optimization, are executed by the database system according to an initial execution plan that is associated with an initial execution time,
   wherein the first query and the second query are identified as the candidate for optimization when the initial execution time satisfies a first threshold value, the first query and the second query are a request to retrieve data from the database system, and a number of executions of the first query and the second query in connection with an application satisfies a second threshold value.

19. The device of claim 15, wherein the first hint and the second hint are included in a plurality of hints that are to be used for determining a plurality of execution plans.

20. The device of claim 15, wherein the first hint provides a first directive to determine the first execution plan, and the second hint provides a second directive to determine the second execution plan, according to one or more of:
   a particular number of rows that are to be returned,
   a rule based optimization,
   a particular table that is to be used first in a table join order,
   a particular index that is to be used for an index scan, a parallel processing using a particular number of processors, a particular table that is to be used as an inner table of a nested loop join operation, a particular access path, or a second particular index that is to be used for a second index scan in a particular sort direction.

* * * * *